United States Patent [19]
Nakada et al.

[11] Patent Number: 5,357,431
[45] Date of Patent: Oct. 18, 1994

[54] CHARACTER STRING RETRIEVAL SYSTEM USING INDEX AND UNIT FOR MAKING THE INDEX

[75] Inventors: Masahiro Nakada; Kenichi Utsumi; Takashi Tsubokura; Masaru Nakahara; Satoshi Itami; Hiroshi Suzuki; Kyouko Miyabe; Satoshi Komura, all of Kawasaki, Japan

[73] Assignee: Fujitsu Limited, Kawasaki, Japan

[21] Appl. No.: 8,810

[22] Filed: Jan. 25, 1993

[30] Foreign Application Priority Data

Jan. 27, 1992 [JP] Japan ................... 4-012074
Sep. 29, 1992 [JP] Japan ................... 4-260078

[51] Int. Cl.$^5$ .................................. G06F 15/38
[52] U.S. Cl. .................................. 364/419.13
[58] Field of Search ............ 364/419.13, 419.12, 364/419.11, 419.14; 395/145, 148

[56] References Cited

U.S. PATENT DOCUMENTS

| | | | |
|---|---|---|---|
| 4,888,730 | 12/1989 | McRae et al. | 364/419.13 |
| 4,959,785 | 9/1990 | Yamamoto et al. | 364/419.12 |

FOREIGN PATENT DOCUMENTS

| | | | |
|---|---|---|---|
| 60-91478 | 5/1985 | Japan | 364/419.12 |
| 60-122465 | 6/1985 | Japan | 364/419.14 |
| 62-241026 | 10/1987 | Japan | |
| 63-22398 | 9/1988 | Japan | 364/419.13 |
| 64-8441 | 1/1989 | Japan | |
| 3-260869 | 11/1991 | Japan | |
| 3-268064 | 11/1991 | Japan | |

Primary Examiner—Donald E. McElheny, Jr.
Attorney, Agent, or Firm—Nikaido, Marmelstein, Murray & Oram

[57] ABSTRACT

A character string retrieval system retrieves a character string corresponding to a retrieval key input thereto from a text file including a plurality of characters. The system includes an index indicating position data identifying a position of each of characters in the text file and indicating next character data identifying either a character or a character string formed of a plurality of characters arranged next to each of the characters in the text file, a selecting unit for selecting a first character from characters forming the character string corresponding to the retrieval key, a determining unit for determining, with reference to said index, whether or not a character or a character string next to the first character, selected by said selecting unit, in the retrieval key is equal to a character or a character string identified by the character data corresponding to the first character; and output unit for outputting a retrieval result when said determining unit determines that a character or a character string next to the first character in the retrieval key is equal to a character or a character string identified by the character data corresponding to the first character, the retrieval result being obtained based on the position data corresponding to the first character in said index.

31 Claims, 21 Drawing Sheets

F I G. 1
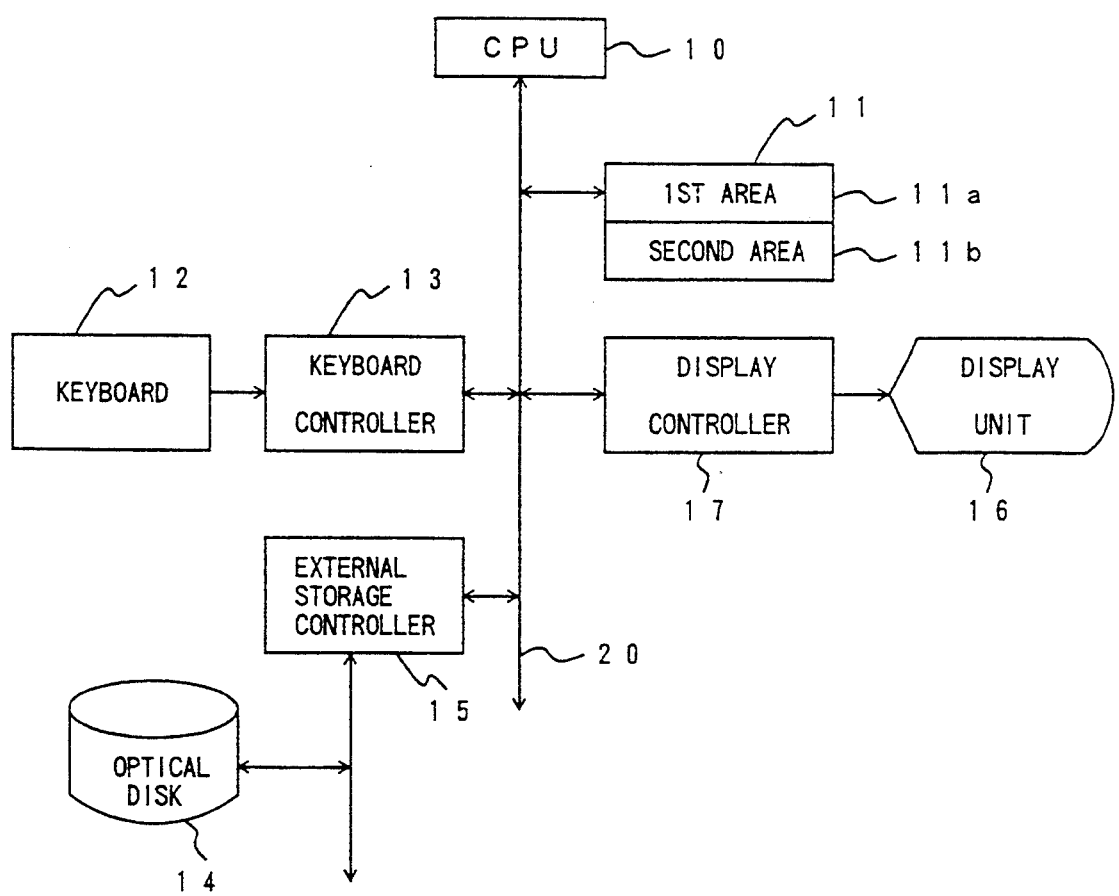

FIG. 2A

TEXT FILE

| 1 | 2 | 3 | 4 | 5 | 6 | 7 | 8 | 9 | 10 | 11 | 12 | 13 |
|---|---|---|---|---|---|---|---|---|----|----|----|----|
| F | U | J | I | T | S | U | A | T | S  | U  | G  | I  |

| 14 | 15 | 16 | 17 | 18 | 19 | 20 | 21 | 22 | 23 | 24 | 25 |
|----|----|----|----|----|----|----|----|----|----|----|----|
| L  | A  | B  | O  | R  | A  | T  | O  | R  | Y  | F  | J  |

FIG. 2B

RETRIEVAL KEY

| F | U | J |
|---|---|---|

FIG. 7

FREQUENCY TABLE

| CHARACTER CODE | FREQIEMCY | POSITION DATA |
|---|---|---|
| B | 1 | 1 |
| ⋮ | ⋮ | ⋮ |
| F | 2 | 5 |
| I | 2 | 7 |
| J | 2 | 9 |
| O | 2 | 11 |
| | | |
| A | 3 | 17 |
| T | 3 | 20 |
| U | 3 | 23 |

ADDRESS TABLE

| ADDRESS INFORMATION | NEXT CHARACTER CODE |
|---|---|
| 16 | O |
| ⋮ | ⋮ |
| 1 | U |
| 24 | J |
| 4 | T |
| 13 | L |
| 3 | I |
| 25 | null |
| ⋮ | ⋮ |
| 20 | O |

| ADDRESS INFORMATION | NEXT CHARACTER CODE |
|---|---|
| 8 | T S |
| 1 5 | B O |
| 1 9 | T O |
| n u l l | n u l l |

「B」

| ADDRESS INFORMATION | NEXT CHARACTER CODE |
|---|---|
| 1 6 | O R |
| n u l l | n u l l |

「C」

| ADDRESS INFORMATION | NEXT CHARACTER CODE |
|---|---|
| n u l l | n u l l |

「F」

| ADDRESS INFORMATION | NEXT CHARACTER CODE |
|---|---|
| 1 | U J |
| 2 4 | J n u l l |
| n u l l | n u l l |

「I」

| ADDRESS INFORMATION | NEXT CHARACTER CODE |
|---|---|
| 4 | T S |
| 1 3 | L A |
| n u l l | n u l l |

「X」

| ADDRESS INFORMATION | NEXT CHARACTER CODE |
|---|---|
| n u l l | n u l l |

「Y」

| ADDRESS INFORMATION | NEXT CHARACTER CODE |
|---|---|
| n u l l | n u l l |

「Z」

| ADDRESS INFORMATION | NEXT CHARACTER CODE |
|---|---|
| n u l l | n u l l |

FIG. 11

| ADDRESS INFORMATION | NEXT CHARACTER CODE |
|---|---|
| 8 | T |
| 15 | B |
| 19 | T |
| null | null |

「A」

| ADDRESS INFORMATION | NEXT CHARACTER CODE |
|---|---|
| 16 | O |
| null | null |

「B」

| ADDRESS INFORMATION | NEXT CHARACTER CODE |
|---|---|
| null | null |

「C」

| ADDRESS INFORMATION | NEXT CHARACTER CODE |
|---|---|
| 1 | U |
| 24 | J |
| null | null |

「F」

| ADDRESS INFORMATION | NEXT CHARACTER CODE |
|---|---|
| 4 | T |
| 13 | L |
| null | null |

「I」

| ADDRESS INFORMATION | NEXT CHARACTER CODE |
|---|---|
| null | null |

「X」

| ADDRESS INFORMATION | NEXT CHARACTER CODE |
|---|---|
| null | null |

「Y」

| ADDRESS INFORMATION | NEXT CHARACTER CODE |
|---|---|
| null | null |

TEXT FULE

| 0 | 1 | 2 | 3 | 4 | 5 | 6 | 7 | 8 | 9 | 10 |
|---|---|---|---|---|---|---|---|---|---|----|
| N | W | N | H | N | W | N | W | T | R | G  |

FIG. 13B

RETRIEVAL KEY

| N | W | N |
|---|---|---|

FIG. 14

INITIAL POSITION TABLE

| CHARACTER CODE | INITIAL POSITION |
|---|---|
| G | 0 |
| T | 1 |
| N | 2 |
| H | 4 |
| R | 5 |
| W | 6 |

ADDRESS TABLE

| NEXT CHARACTER CODE | CHARACTER NUMBER CODE | POSITION DATA | | |
|---|---|---|---|---|
| null | 1 | 10 | | |
| R | 1 | 8 | | |
| H | 1 | 2 | | |
| W | 3 | 0 | 4 | 6 |
| N | 1 | 3 | | |
| G | 1 | 9 | | |
| T | 1 | 7 | | |
| N | 2 | 1 | 5 | |

FIG. 16

INITIAL POSITION TABLE

| CHARACTER CODE | FREQUENCY | INITIAL POSITION |
|---|---|---|
| G | 1 | 0 |
| T | 1 | 1 |
| N | 4 | 2 |
| H | 1 | 4 |
| R | 1 | 5 |
| W | 3 | 6 |

ADDRESS TABLE

| NEXT CHARACTER CODE | CHARACTER NUMBER CODE | POSITION DATA | | |
|---|---|---|---|---|
| null | 1 | 1 0 | | |
| R | 1 | 8 | | |
| H | 1 | 2 | | |
| W | 3 | 0 | 4 | 6 |
| N | 1 | 3 | | |
| G | 1 | 9 | | |
| T | 1 | 7 | | |
| N | 2 | 1 | 5 | |

CHARACTER STRING RETRIEVAL SYSTEM USING INDEX AND UNIT FOR MAKING THE INDEX

BACKGROUND OF THE INVENTION (1) Field of the Invention

The present invention generally relates to a character string retrieval system using an index and a unit for making the index, and more particularly to a character string retrieval system in which a character string input, as a retrieval key, thereto is retrieved from a text file with reference to the index, and a unit for making the index used in the character string retrieval system.

(2) Description of the Related Art

Conventionally, two types of character string retrieval systems have been proposed. In the first type, a character string is retrieved from characters in a text file without an index. That is, the text file is read and a character string corresponding to a retrieval key is searched in the text file. In the second type, a character string is retrieved from characters in a text file with reference to an index. That is, words which can be retrieval keys are extracted from the text file, an index regarding the extracted words having been made previously. A character string corresponding to a retrieval key input by an operator is searched with reference to the index.

However, the above first and second types of the character string retrieval systems have the following disadvantages.

In the first type, as all characters in the text file must be read out, when retrieving a text file including a large number of characters is being retrieved, a retrieving time increases. In the second type, it is difficult to choose words which can be retrieval keys in each text file. Thus, a long time is required for making the index. Furthermore, a character string which is not included in the index can not be retrieved.

A character string retrieval system similar to the above second type is disclosed, for example, in Japanese Patent Laid Open Application No. 64-8441. This character string retrieval system are provided with an address table having entries corresponding to characters forming a text file. In the address table, the same characters in the text file is linked using address information stored in the entries. A character string corresponding to a retrieval key is retrieved with reference to the address table.

In this system, entries for all the characters in the text file must be provided in the address table. For example, although "hiragana" (Japanese characters of a certain type) is almost never used for retrieving a character string, the address table must be provided with entries corresponding to "hiragana" characters. Thus, the address table must have a large capacity.

SUMMARY OF THE INVENTION

Accordingly, a general object of the present invention is to provide a novel and useful character string retrieval system using an index and a unit for making the index in which the disadvantages of the aforementioned prior art are eliminated.

A more specific object of the present invention is to provide a character string retrieval system in which character strings can be retrieved from characters in a text file at a high speed.

Another object of the present invention is to provide a character string retrieval system in which an index used for retrieving character strings can be easily made.

Furthermore, another object of the present invention is to provide a character string retrieval system suited for a wide variety of uses.

The above objects of the present invention are achieved by a character string retrieval system for retrieving a character string corresponding to a retrieval key input thereto from a text file including a plurality of characters, said system comprising: an index indicating position data identifying a position of each of characters in the text file and indicating next character data identifying either a character or a character string formed of a plurality of characters arranged next to each of the characters in the text file; selecting means for selecting a first character from characters forming the character string corresponding the retrieval key; determining means for determining, with reference to said index, whether or not a character or a character string next to the first character, selected by said selecting means, in the retrieval key is equal to a character or a character string identified by the character data corresponding to the first character; and output means for outputting a retrieval result when said determining means determines that a character or a character string next to the first character in the retrieval key is equal to a character or a character string identified by the character data corresponding to the first character, the retrieval result being obtained based on the position data corresponding to the first character in said index.

According to the present invention, a character string corresponding to the retrieval key can be easily retrieved from the text file based on the next character code and the position data listed in the index. Thus, the character string can be retrieved at a high speed. In addition, as the position data and the next character data can be easily obtained by searching characters in the text file, the index can be easily made. Furthermore, as the position data and the next character data can be obtained from any text file, the character string retrieval system is suited for the wide use.

Another object of the present invention is to provide a unit for making the index used in the character string retrieval system.

This object of the present invention is achieved by a unit for making an index used in a character string retrieval system for retrieving a character string corresponding to a retrieval key input thereto from a text file including a plurality of characters, said index indicating frequency data for each of the characters in the text file, the frequency data indicating a frequency at which each of the characters appears in the text file, said unit comprising: searching means for successively searching characters in the text file one by one; counting means for counting a number of appearances of a character in the text file, said character being searched by said searching means; and listing means for listing the frequency data corresponding to a count value obtained by said counting means, so that the index indicating the frequency data is made.

Additional objects, features and advantages of the present invention will become apparent from the following detailed description when read in conjunction with the accompanying drawings.

DESCRIPTION OF THE DRAWINGS

FIG. 1 is a block diagram illustrating a computer system in which a character string retrieval system according to the present invention is constructed.

FIG. 2A is a diagram illustrating an example of a text file.

FIG. 2B is a diagram illustrating an example of a character string corresponding to a retrieval key.

FIG. 7 is a diagram illustrating a second embodiment of the index used in the character string retrieval system.

FIG. 9 is a diagram illustrating a third embodiment of the index used in the character string retrieval system.

FIG. 11 is a diagram illustrating a fourth embodiment of the index used in the character string retrieving system.

FIG. 13A is a diagram illustrating another example of the text file.

FIG. 13B is a diagram illustrating another example of the character string corresponding to the retrieval key.

FIG. 14 is a diagram illustrating a fifth embodiment of the index used in the character string retrieval system.

FIG. 16 is a diagram illustrating a sixth embodiment of the index used in the character string retrieval system.

DESCRIPTION OF THE PREFERRED EMBODIMENTS

Figure 3:
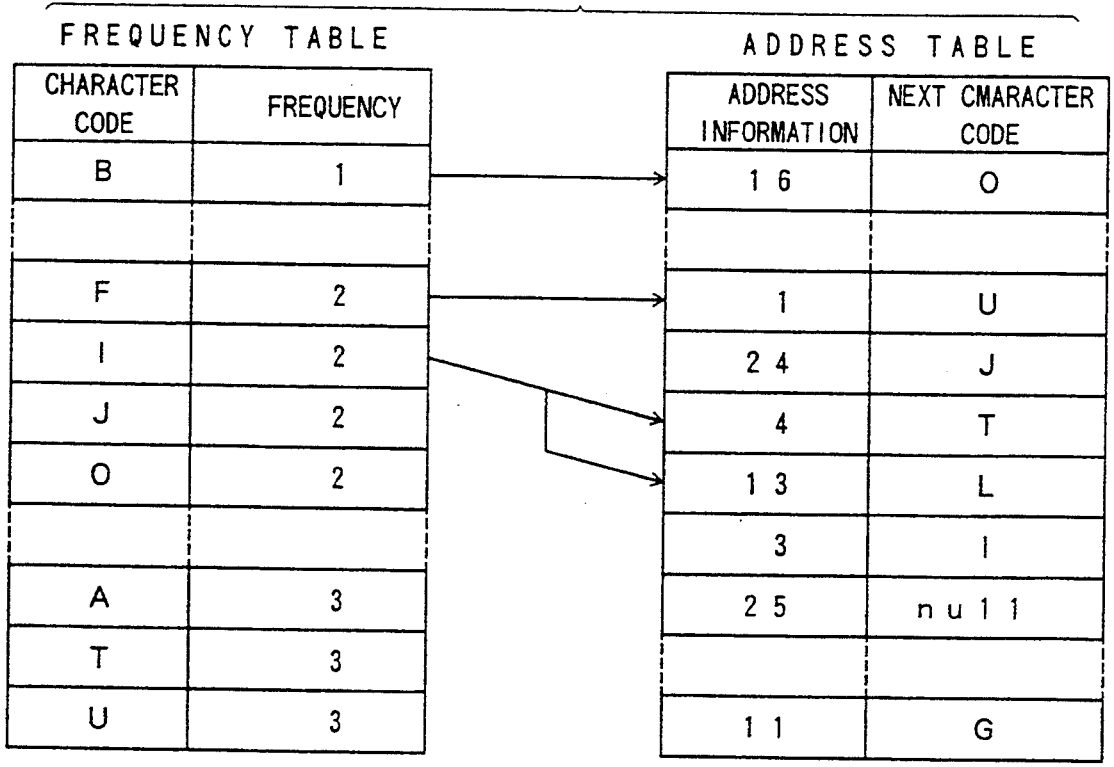
FIG. 3 is a diagram illustrating a first embodiment of an index used in the character string retrieval system.

A description will now be given of embodiments of the present invention.

A character string retrieval system is constructed, for example, in a computer system as shown in FIG. 1. Referring to FIG. 1, a CPU (central processing unit) 10, a memory 11, a keyboard controller 13, an external storage controller 15, and a display controller 17 are coupled to each other by a system bus 20. The memory 11 is provided with a first area 11a for storing various control programs and a second area 11b for storing various items of data. The keyboard controller 13 is connected with a keyboard 12, so that instructions, data such as retrieval keys and the like input from the keyboard 12 can be supplied to the system bus 20 via the keyboard controller 13. The external storage controller 15 is connected with an optical disk unit 14. Text files and corresponding indexes used in the character string retrieval system are stored in the optical disk unit 14. A character string corresponding to a retrieval key input by the keyboard 12 is retrieved from a text file identified by information input by the keyboard 12 with reference to an index corresponding to the text file. Retrieving results are supplied to the display unit 16 via the display controller 17 and displayed on the display unit 16.

A description will now be given of a case where a character string corresponding to a retrieval key as shown in FIG. 2B is retrieved from characters in a text file as shown in FIG. 2A.

An index used for retrieving character strings from the text file has been previously made and stored in the optical disk 14. The index includes a frequency table and an address table as shown in FIG. 3. The frequency table has frequency data corresponding to each character code indicating characters in the text file. The frequency data indicates a frequency with which each of the characters appears in the text file. In the frequency table, the character codes are sorted in an order where values of the corresponding frequency data increase from a minimum value. Character codes corresponding to the same frequency data are sorted in the order in which values of the character codes increase from a minimum value. In the text file as shown in FIG. 2A, the frequency with which a character "B" appears in the text file is "1" (the minimum value). Thus, the character code "B" and corresponding frequency data "1" are listed at the head of the frequency table. The frequency with which a character "U" appears in the text file is "3" (the maximum value). Thus, the character code of "U" and corresponding frequency data "3" are listed at the tail end of the frequency table. The frequency data corresponding to the character code "F" is the same as that corresponding to the character code "I". The value of the character code "F" is less than the value of the character code "I". Thus, the character code "I" and corresponding frequency data "2" are arranged next to the character code "F" and corresponding data "2" in the frequency table.

The address table has address information identifying a position of each of the characters in the text file. The position of each of the characters is indicated by the number of bytes from the head of the text file. In the address table, the address information of each character is listed in such an order where values of the frequency data corresponding to characters increase from a minimum value. In a case where the frequency data corresponding to a character is greater than or equal to "2", the address information of the character is listed in the order where values of the frequency data increase from a minimum value. The character "I" appears at the 4-th position and 13-th position in the text file. Thus, the address table has address information "4" (bytes) and "13" (bytes) corresponding to the character code "I". In this case, the address information "13" is listed next to "4" in the address table. The address table has also a next character code corresponding to each character code. The next character code indicates a character arranged next to each character in the text file. A character "O" is, for example, arranged next to a character "B" positioned at the 16-th position in the text file. Thus, the address table is provided with a character code "O" as the next character code corresponding to the character code "B".

In general, Japanese "hiragana" characters are not always used as retrieval keys. Thus, if Japanese "hiragana" character are included in the text file, the frequency data, the address information and the next character codes for the Japanese "hiragana" character may be omitted from the frequency table and the address table.

Figure 4:
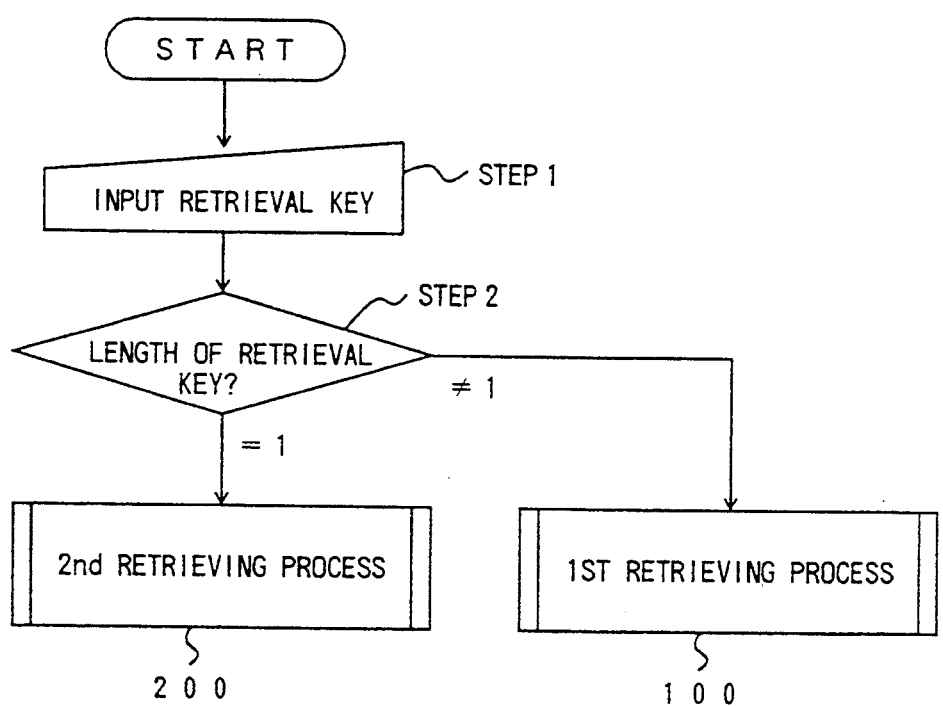
FIG. 4 is a diagram illustrating a flow chart of a process for determining whether a first retrieving process for a case where a retrieval key includes a plurality of characters or a second retrieving process for a case where a retrieval key includes only one character is to be performed.
Figure 5:
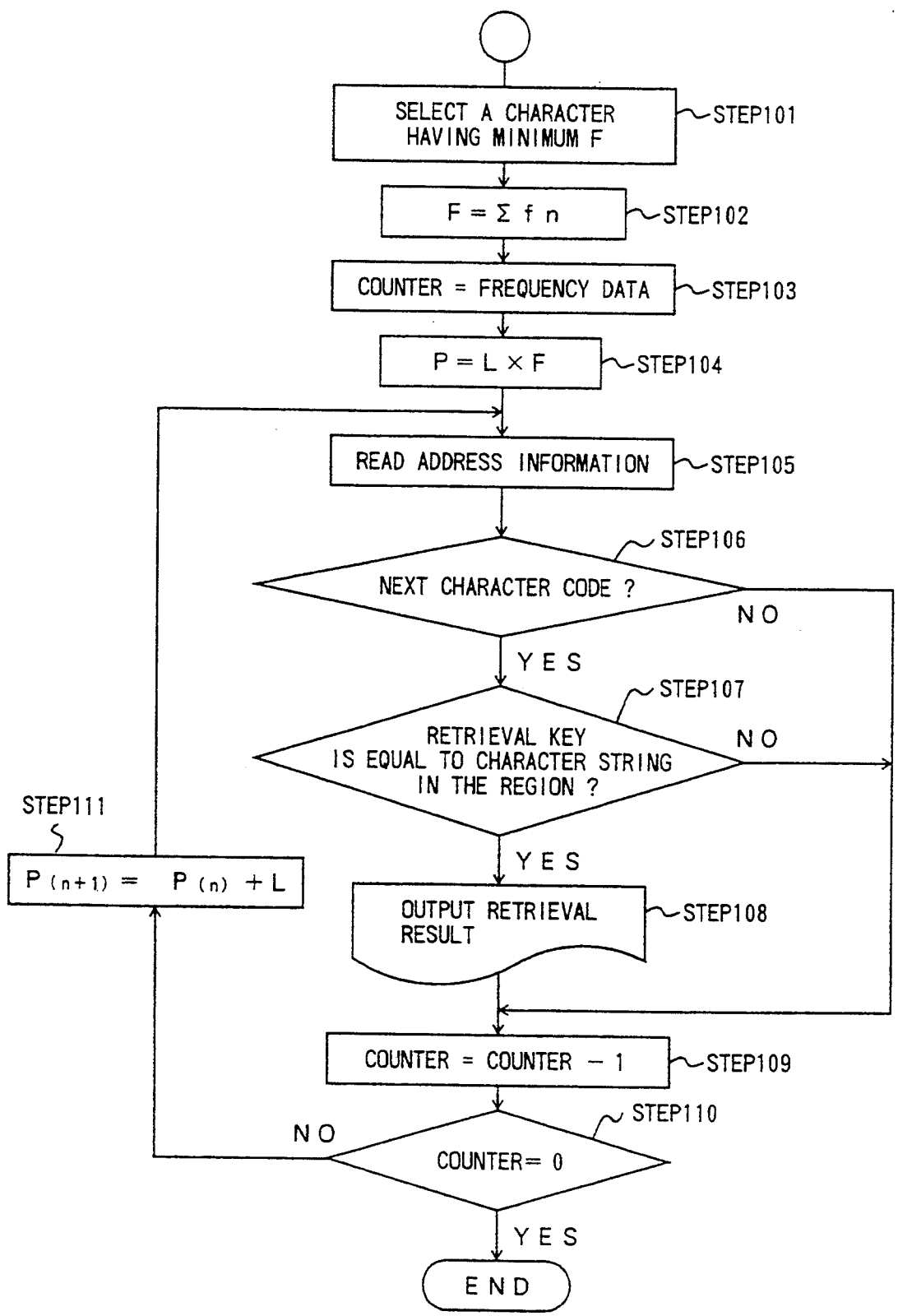
FIG. 5 is a flow chart of a first embodiment of the first retrieving process.
Figure 6:
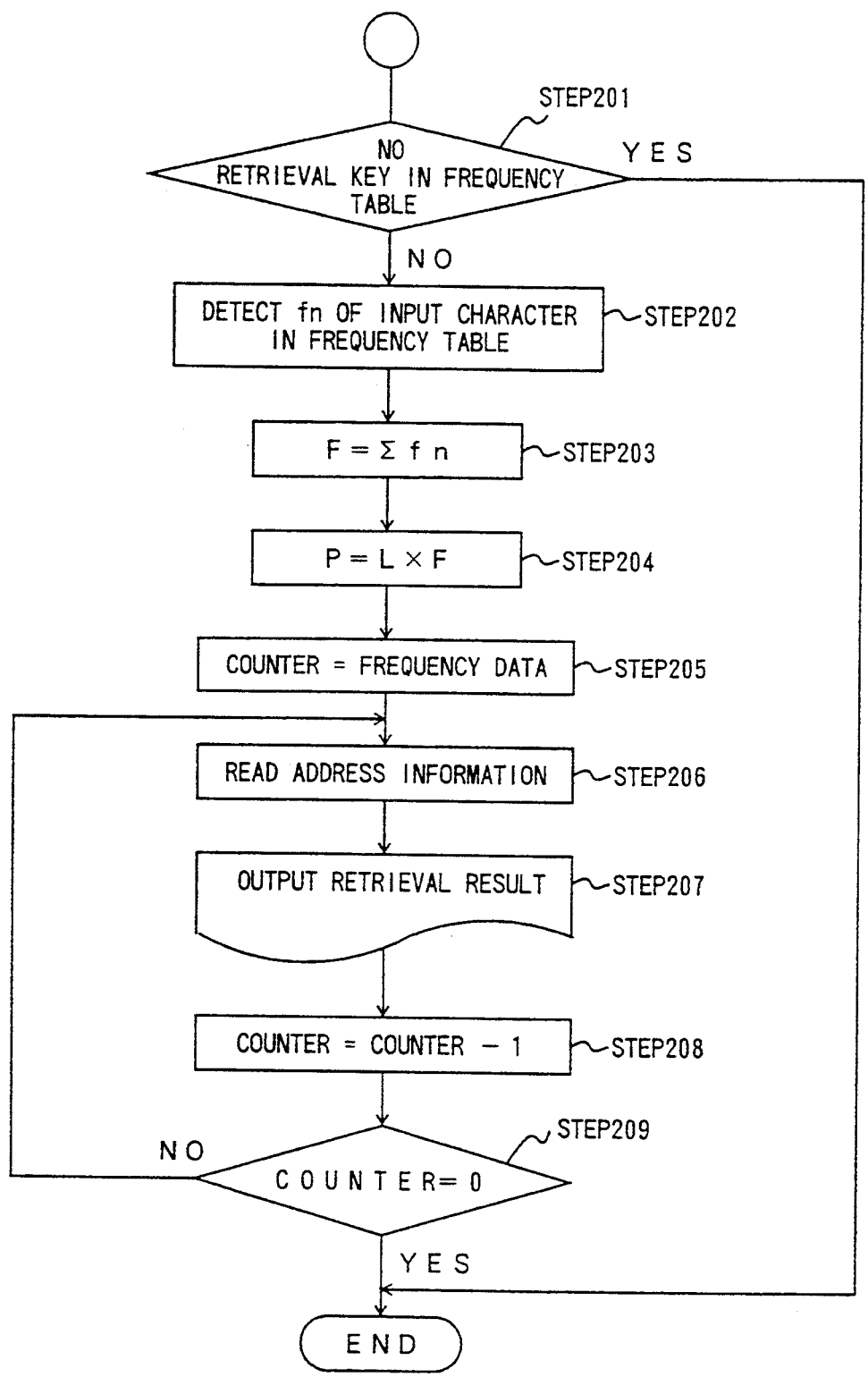
FIG. 6 is a flow chart of an example of the second retrieving process.

A retrieving process is performed in accordance with the flow charts shown in FIGS. 4, 5 and 6.

Referring to FIG. 4, after a retrieval key is input from the keyboard 12 in step 1, the CPU 10 determines whether or not the number of characters included in the retrieval key (a retrieval key length) is one, in step 2. When the retrieval key includes a plurality of characters as shown in FIG. 2B, a first retrieving process 100 is performed. On the other hand, when the retrieval key includes only one character, a second retrieving process 200 is performed.

The first retrieval process is performed in accordance with the flow chart shown in FIG. 5. Referring to FIG. 5, in step 101, a character having a minimum frequency data is selected from among characters of the retrieval key, except a character positioned at a tail end of the retrieval key, with reference to the frequency table. In the case of the retrieval key "FUJ" as shown in FIG. 2B, as frequency data "2" of the character "F" is less than frequency data "3" of the character "U" the character "F" is selected. Then, frequency data fn of respective characters is successively added in an order from a character listed at the head of the frequency table to a character immediately before the above selected character in the frequency table, and the total sum F of the frequency data fn is calculated in step 102. The address table includes the address information of characters sorted in an order where corresponding frequency data increases from a minimum value. Thus, the total sum F of the frequency data fn corresponds to a position at which the address information of the selected character is listed in the address table. After that, the frequency data of the selected character is set in a counter in step 103. In the case of the retrieval key shown in FIG. 2B, the frequency data "2" of the character "F" is set in the counter.

In step 104, a position P (indicated by the number of bytes) at which the address information of the selected character is listed in the address table is calculated in accordance with the following formula;

$$P = L \times F$$

where L is the number of bytes used for describing one address information and F is the total sum of the frequency data calculated in step 102. Then, in step 105, the CPU 10 reads out the address information and the corresponding next character code from the position P, calculated in step 104, in the address table. In the case of the retrieval key "FUJ" as shown in FIG. 2B, the address information "1" and the next character code "U" are read out from the address table. Then, in step 106, it is determined whether or not a character next to the selected character in the retrieval key is equal to a character identified by the next character code read out from the address table in step 105. When the character next to the selected character in the retrieval key is equal to the character identified by the next character code, the CPU 10 searches characters in a predetermined region in the text file, which region includes a position identified by the address information read out from the address table. Then, in step 107, it is further determined whether or not a character string formed of the characters of the retrieval key is in the region in the text file. When there is a character string equal to that of the retrieval key in the region including the position identified by the address information in the text file, a retrieval result indicating that the character string of the retrieval key is in the region in the text file is obtained. The retrieval result is then displayed on the display unit 16, in step 108. In the case of the retrieval key "FUJ", a character "U" next to the selected character "F" in the retrieval key is equal to a character identified by the next character code "U". As a result, a character string "FUJ" positioned at the head of the text file is obtained as the retrieval result.

When the count value of the counter has not yet reached zero (step 110), the next position P(n+1) at which the address information of the selected character is located in the address table is calculated in accordance with the following formula.

$$P(n+1) = P(n) + L$$

where P(n) is a position which has been obtained by the previous calculation. After the next position is calculated, steps 105 through 110 are successively executed again. In the case of the retrieval key as shown in FIG. 2B, the CPU reads out the address information "24" and the next character code "J" from the next position in the address table. In this case, as the character "U" next to the selected character "F" in the retrieval key is not equal to a character "J" identified by the next character code, the process proceeds from step 106 to step 109. Furthermore, even if a character next to the selected character in the retrieval key is equal to a character identified by the next character code readout from the address table, in a case where there is no character string equal to that of the retrieval key in the region including the position identified by the address information in the text file, the process proceeds from step 107 to step 109. After this, when the count value of the counter reaches zero, the process is completed.

The second retrieval process 200 is performed in accordance with the flow chart shown in FIG. 6.

In a case where the retrieval key input from the keyboard 12 includes only one character, the CPU 100 searches the frequency table and determines whether or not the frequency table has a character equal to the retrieval key, in step 201. Hereinafter, the character equal to the retrieval key is named an input character. In step 202, the CPU 10 detects the frequency data fn of the input character in the frequency table. Then, frequency data fn of respective characters is successively added in an order from a character listed at the head of the frequency table to a character immediately before the above input character in the frequency table, and the total sum F of the frequency data fn is calculated in step 203. After that, in step 204, a position at which the address information of the input character is listed is calculated using the total sum F of the frequency data fn, in step 205, the frequency data corresponding to the input character is set in the counter, and in step 206, the CPU 10 reads out the address information from the position in the address table, which position is calculated in step 206, in the same manner as in the first retrieval process 100. Then, the address information and the input character are displayed, as the retrieval result, on the display unit 16, in step 207. After step 207, the count value of the counter is decremented by one in step 208 and it is then determined whether or not the count value of the counter reaches zero in step 209. The above steps 206 through 209 are repeated until the count value of the counter reaches zero. As a result, the number of retrieval results equal to the value of the frequency data of the input character is displayed on the display unit 16.

According to the above retrieval process, a character having the minimum frequency data is selected from among the characters of the retrieval key with reference to the frequency table, and it is then determined whether or not a character next to the selected character in the retrieval key is equal to a character identified by the next character code in the address table. Then, a character string equal to that of the retrieval key is retrieved from the text file using the determination result regarding the next character and address information in the address table. Thus, the character string can be retrieved from the text file by a small number of reference operations of the address table. That is, the retrieving time can be decreased.

In addition, the address table is formed of only the address information identifying the position of each character in the text file and the next character code identifying a character next to each character in the text file. Thus, the address table can be easily formed in a short time. The address information, the next character code and the frequency data corresponding to a character which is not usually used for retrieving a character string from the text file can be omitted from the address table and the frequency table. Thus, the amount of information in the index (the address table and the frequency table) used for retrieving character strings from the text file can be decreased.

The frequency table and the address table as shown in FIG. 7 can be also used for retrieving character strings from the text file.

The address table shown in FIG. 7 has the same structure as that shown in FIG. 3, the frequency table shown in FIG. 7 has the character codes of characters in the file, the frequency data corresponding to each character code and position data corresponding to each character code. The position data indicates a starting position from positions at which the address information corresponding to the same characters is listed in the address table. The frequency table is provided with position data "5" and frequency data "2" corresponding to the character "F". That is, the address information "1" and "24" corresponding to the character "F" is listed at the fifth position which is the starting position identified by the position data "5" and the sixth position in the address table.

Figure 8:
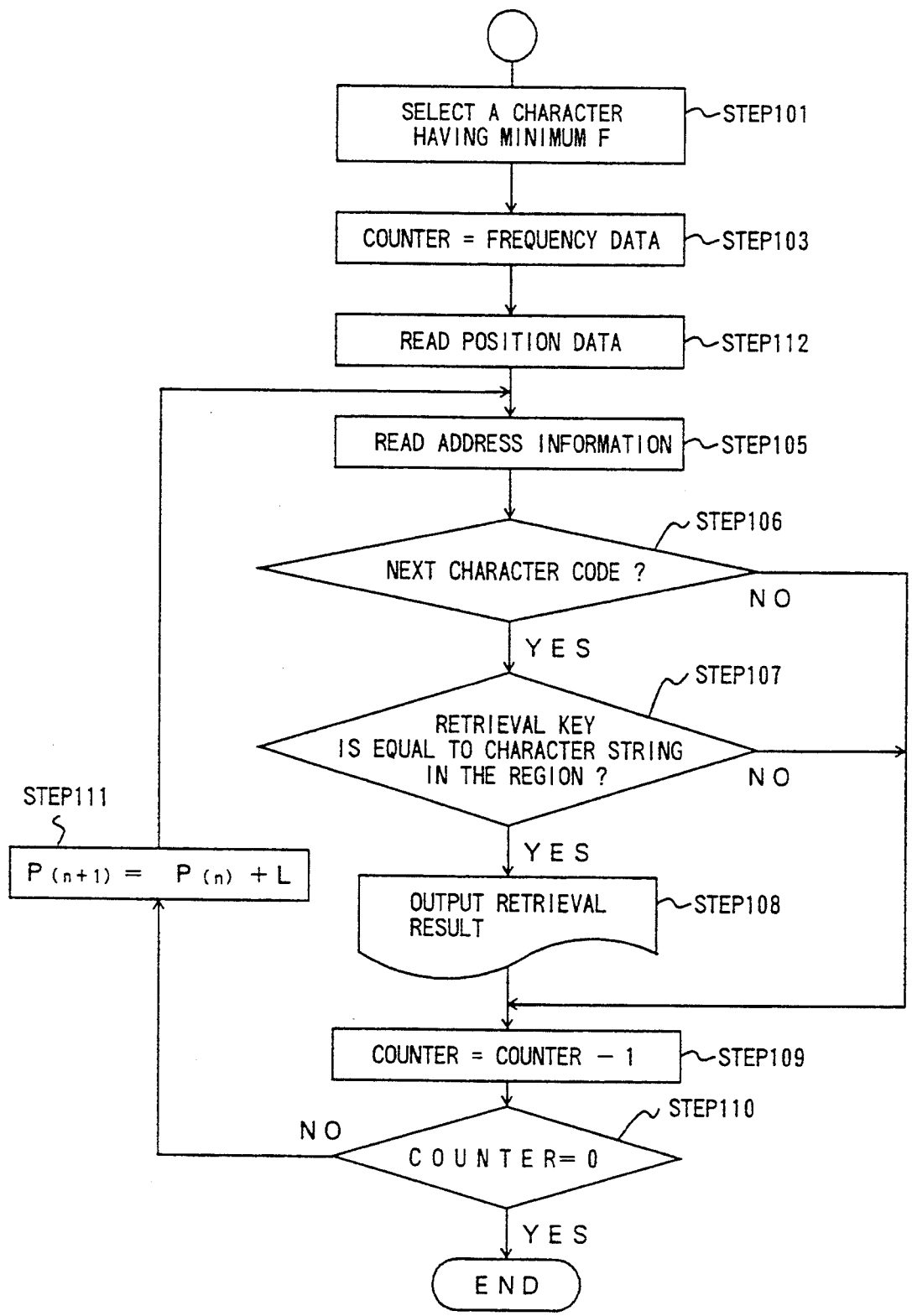
FIG. 8 is a flow chart illustrating a second embodiment of the first retrieving process.

The first retrieving process 100 may be performed with reference to the frequency table and the address table as shown in FIG. 7, in accordance with the flow chart as shown in FIG. 8. In FIG. 8, those steps which are the same as the steps shown in FIG. 5 are given the same reference numbers.

Step 102, shown in FIG. 5, for calculating the total sum F of the frequency data fn which total sum F corresponds to a position at which the address information of the selected character obtained in step 101 is listed in the address table is removed from the process shown in FIG. 8. Step 112 between steps 103 and 105 is substituted for step 104 shown in FIG. 5. That is, after the frequency data corresponding to the selected character is set in the counter, the CPU 10 read out the position data corresponding to the selected character from the frequency table, in step 112. Then, in step 105, the CPU 10 reads out the address information from a position in the address table, which position is identified by the position data obtained in step 112. Other steps are the same as those shown in FIG. 5.

According to the first retrieving process which is performed with reference to the frequency table and the address table as shown in FIG. 7, as the frequency table is provided with the position data for each character, it is unnecessary to calculate the total sum F of the frequency data fn which total sum F corresponds to the position of the selected character. Thus, the character strings can be retrieved at a high speed.

Character strings can be retrieved from the text file with reference to address tables as shown in FIG. 9. In this case, the frequency table as shown in FIGS. 5 and 7 need not be used.

Address tables for respective characters which probably will appear in text files have been previously made as shown in FIG. 9. Each of the address tables is provided with address information and next character codes corresponding to respective characters included in a text file. The address information identifies a position at which the corresponding character is positioned in the text file. The next character codes identify two characters next to each character in the text file. For example, a character "A" is positioned at eighth position, 15-th position and 19-th position in the text file as shown in FIG. 2A. Thus, the address table for the character "A" is provided with the address information "8", "15" and "19" corresponding to the character "A". In addition, characters "TS" are arranged next to the character "A" at the eighth position in the text file, characters "BO" are arranged next to the character "A" at the 15-th position, and characters "TO" are arranged next to the character "A" at the 19-th position in the text file. Thus, the address table for the character "A" is provided with the next character codes "TS", "BO" and "TO" respectively corresponding to the address information "8", "15" and "19". The last address information and the next character codes in each of the address tables are indicated by "null". The address information and the next character codes in each of the address tables for characters which are not included in the text file are indicated by "null". Furthermore, the next character codes for a character positioned at an end of the text file is also indicated by "null".

Figure 10:
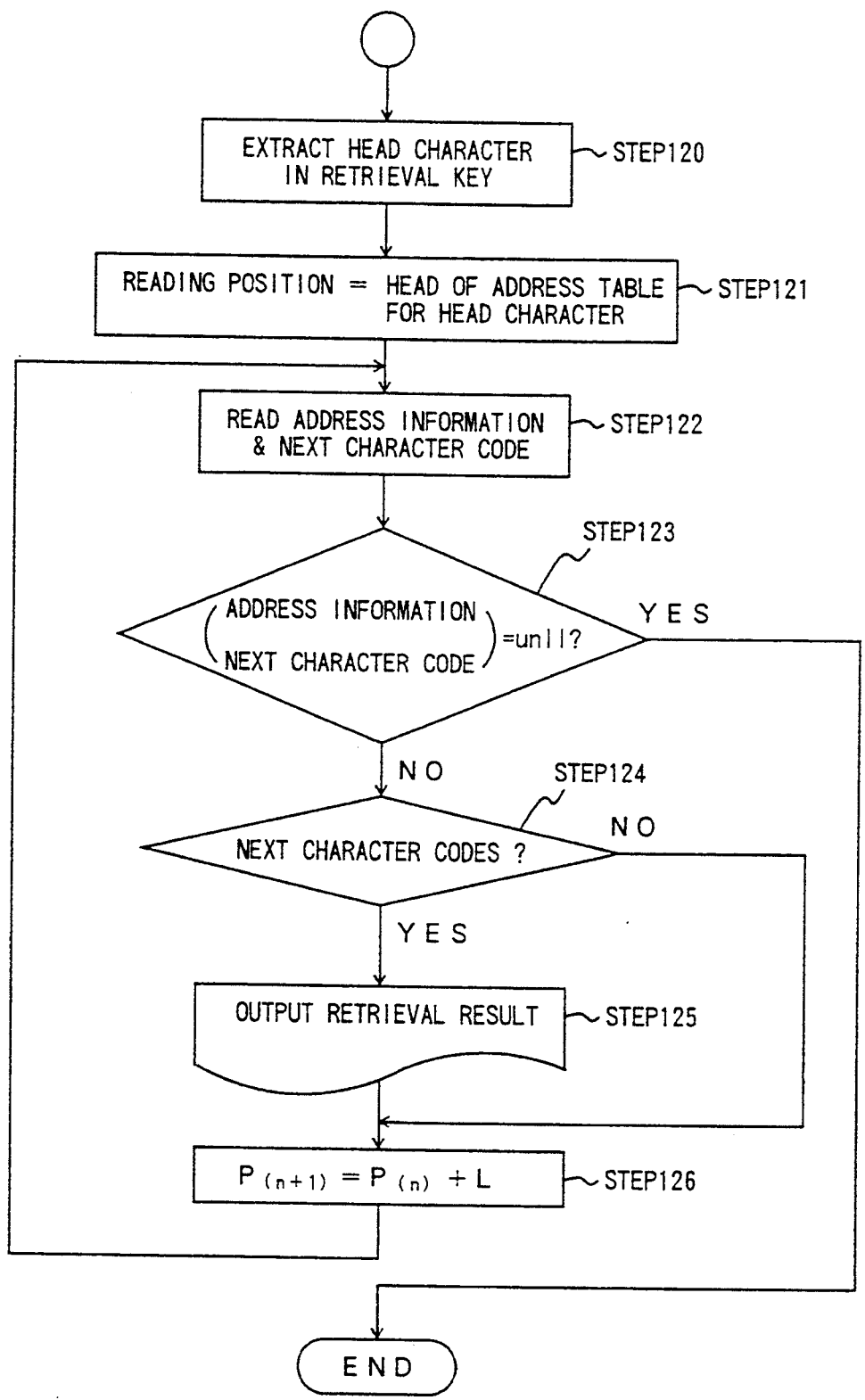
FIG. 10 is a flow chart illustrating a third embodiment of the first retrieving process.

The first retrieving process 100 is performed with reference to the address tables as shown in FIG. 9, in accordance with the flow chart as shown in FIG. 10.

Referring to FIG. 10, in step 120, the CPU 10 extracts a head character, which is the character positioned at the head of the retrieval key input from the the key board 12, from characters of the retrieval key. In step 121, the CPU 10 sets a reading position at the head of the address table for the head character extracted in step 120. In step 122, the address information and the character codes are read out from the reading position in, set in step 121, the address table for the head character. After this, it is determined that either the address information or the character codes is "null" in step 123. When the address information and the character codes are "null", the process is completed. On the other hand, when the address information and the character codes are not "null", it is further determined whether or not two characters next to the head character in the retrieval key are equal to characters identified by the next character codes, in step 124. When the two characters next to the head character in the retrieval key are equal to the characters identified by the next character codes, a retrieval result is obtained, which result indicates that a character string formed of the characters of the retrieval key has been retrieved from the text file. As a result, in step 125, the retrieval result (including a position identified by the address information) is displayed on the display unit 16. After this, a position P(n+1) at which the next address information is listed in the address table for the head character is calculated in accordance with the following formula;

$$P(n+1)=P(n)+L$$

where P(n) indicates the position from which the address information has been previously read out and L corresponds to the number of bytes used for describing one address information item. After the next position P(n+1) is calculated, the process returns to step 122. Steps 122 through 126 are then performed again. When the two characters next to the head character in the retrieval key are not equal to the characters identified by the next character codes at the next position P(n+1) in the address table for the head character, the retrieval result is not displayed on the display unit 16 and the process proceeds to step 126. After this, the above process is repeated.

In a case where the text file as shown in FIG. 2A is selected and the retrieval key "FUJ" as shown in FIG. 2B is input from the keyboard 12, the head character "F" is extracted from the characters "FUJ" of the retrieval key. Characters "U" and "J" next to the head character "F" in the retrieval key are equal to characters identified by the next character codes in the initial position in the address table for the head character "F". Thus, the character string, corresponding to the retrieval key, having the head character "F" positioned at a position identified by the address data "1" is retrieved from the text file. On the other hand, the characters "U" and "J" next to the head character "F" in the retrieval key are not equal to characters identified by the next character codes "J" and "null" in the second position in the address table for the head character "F". Thus, in this case, the retrieval result indicating that the character string corresponding to the retrieval key is in the text file is not obtained.

According to the above retrieving process, as a character string corresponding to the retrieval key is always retrieved based on the head character of the retrieval key, the character string corresponding to the retrieval key can be retrieved from the text file without using the frequency table as shown in FIGS. 3 and 7.

Address tables for a plurality of characters as shown in FIG. 11 can be also used for retrieving character strings from the text file without using the frequency table.

Each of the address tables shown in FIG. 11 is provided with only one next character code corresponding to address information. For example, the address table for the character "A" is provided with a single character code "T" corresponding to the address information "8".

Figure 12:
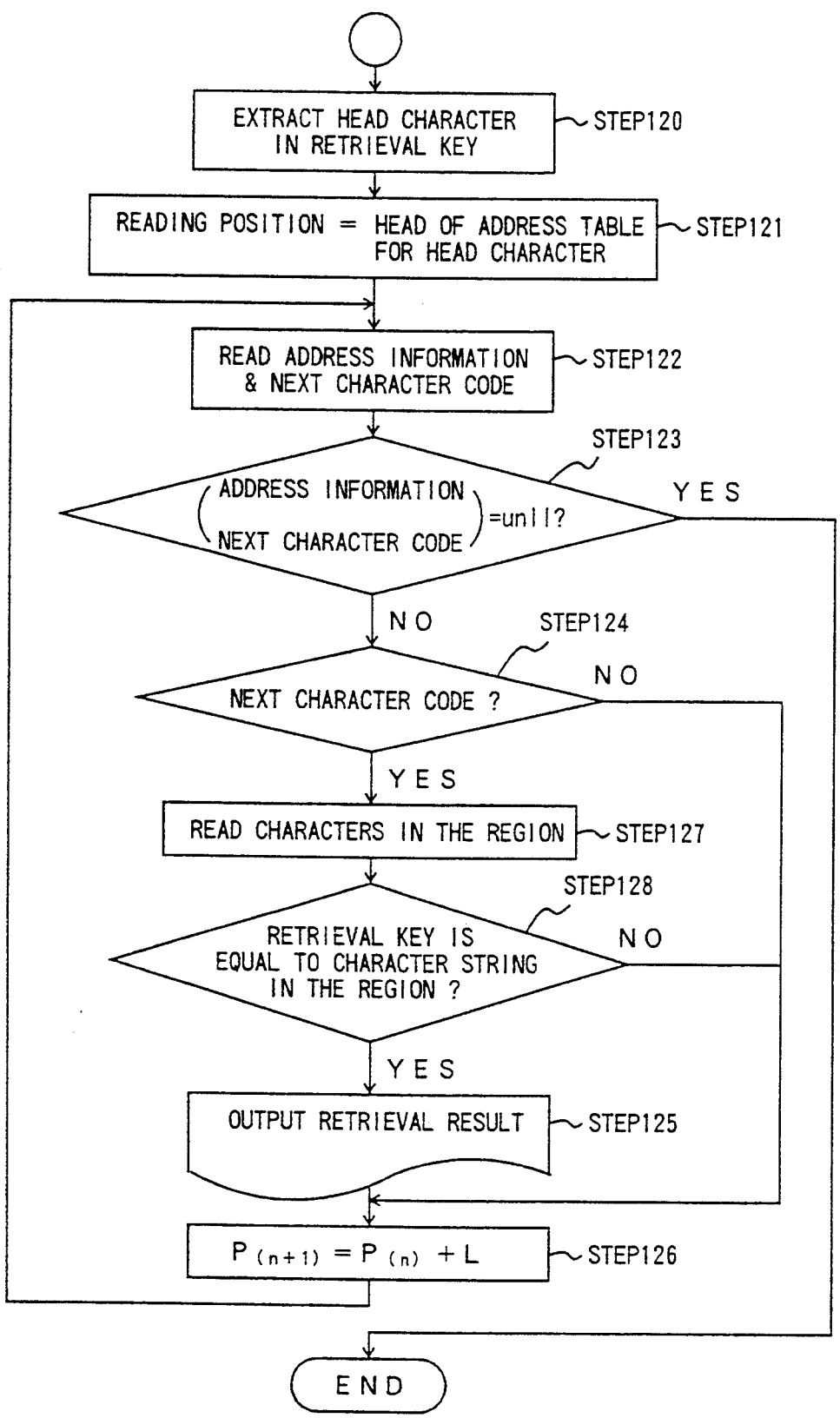
FIG. 12 is a flow chart illustrating a fourth embodiment of the first retrieving process.

The first retrieving process 100 is performed with reference to the address tables as shown in FIG. 11, in accordance with the flow chart as shown in FIG. 12. In FIG. 12, those steps which are the same as the steps shown in FIG. 10 are given the same reference numbers.

Referring to FIG. 12, to precisely retrieve the character string from the text file with reference to the address table provided with only one character code corresponding to the address information for one character, steps 127 and 128 added between steps 124 and 125. That is, when it is determined that a character next to the head character in the retrieval key is equal to the character identified by the character code, the CPU 10 reads out characters in a predetermined region of the text file, which region includes a position identified by the address information read out in step 122, in step 127. Then, in step 128, it is further determined whether or not there is a character string formed of the characters of the retrieval key in the region in the text file. When there is a character string equal to that of the retrieval key in the region including the position identified by the address information in the text file, a retrieval result indicating that the character string of the retrieval key is in the region in the text file is obtained. The retrieval result is then displayed on the display unit 16, in step 125.

Next, a description will now be given of a case where a character string corresponding to a retrieval key as shown in FIG. 13B is retrieved from characters in a text file as shown in FIG. 13A.

The index used for retrieving character strings from the text file includes an initial position table and an address table as shown in FIG. 14. The initial position table has initial position information corresponding to each of character codes indicating characters in the text file. The initial position data indicates the position at which information for each character is initially listed in the address table. The address table is provided with next character codes each of which corresponds to a character listed in the initial position table. The next character code indicates a character next to a corresponding character in the text file. That is, for example, a next character code of "R" corresponds to a character "T", and both next character codes of "H" and "W" correspond to a character "N". As a character "G" is positioned at a tail end of the text file shown in FIG. 13A, a character code corresponding to the character "G" is indicated by "null". The characters included in the text file are classified under the respective next character codes. That is, the characters classified under each next character code are positioned immediately before the character identified by each next character code in the text file. The address table is also provided with character number data and position data (address information). The character number data indicates the number of appearances of each character string formed of two characters identified by the character code in the initial position table and a corresponding next character code in the address table. The position data indicates positions at which characters appears in the text file, which characters are classified under each next character code. For example, three characters "N" are classified under the character code of "W", and are positioned at positions "0", "4" and "6" in the text file shown in FIG. 13A. That is, the character string "NW" appears the text file shown in FIG. 13A in three times.

Figure 15:
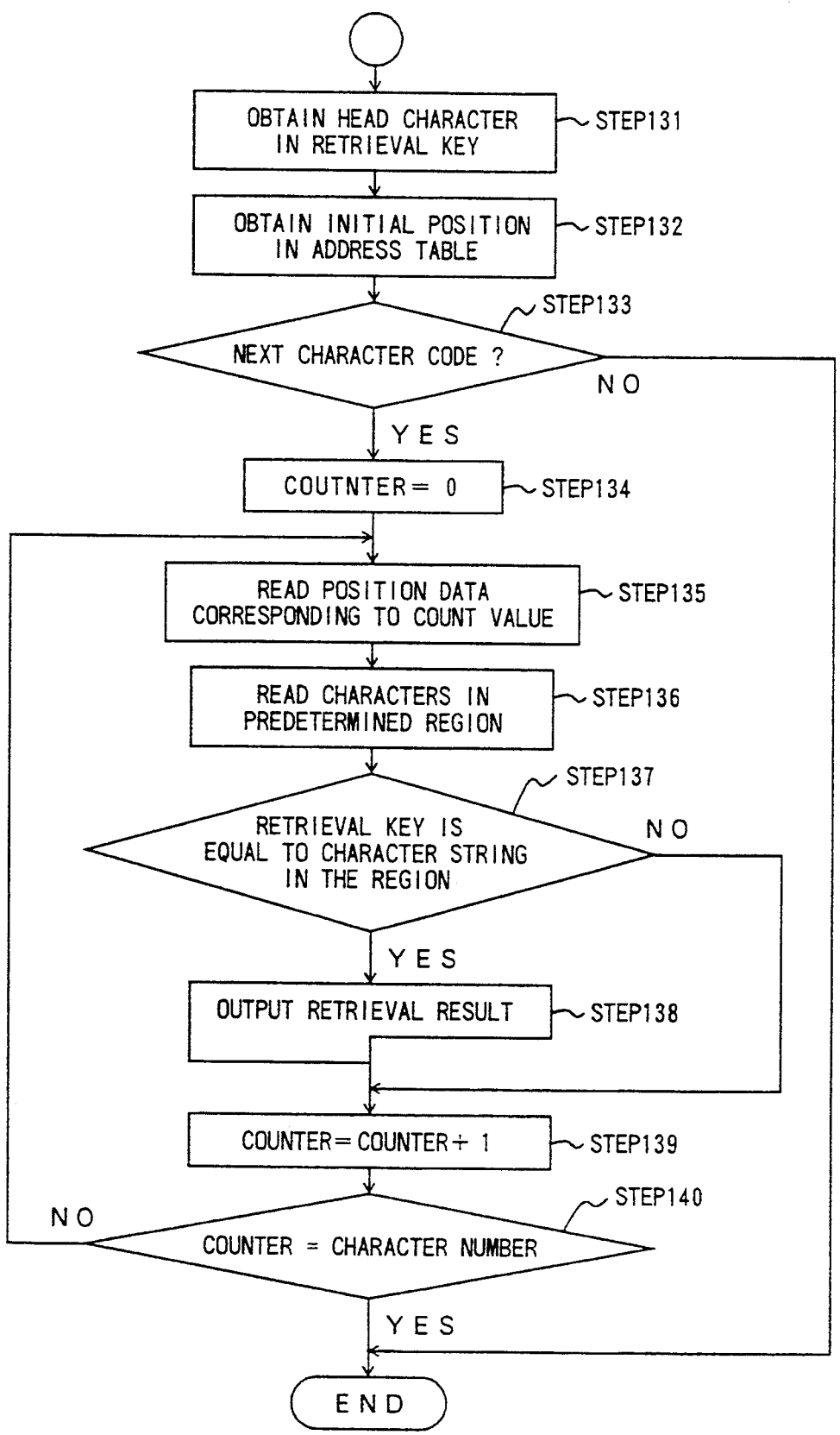
FIG. 15 is a flow chart illustrating a fifth embodiment of the first retrieving process.

The first retrieval process is performed, with reference to the initial position table and the address table shown in FIG. 14, in accordance with a flow chart as shown in FIG. 15.

Referring to FIG. 15, in step 131, the CPU 10 extracts a head character, which is a character positioned at the head of the retrieval key input from the the key board 12, from characters of the retrieval key. In step 132, the CPU 10 obtains, with reference to the initial position table, the initial position data corresponding to the head character extracted in step 131. One or plurality of next character codes listed at positions including the initial position are searched, which next character codes correspond to the head character. In step 133, it is determined, with reference to the address table, whether or not a character next to the head character in the retrieval key is equal to a character identified by the next character code corresponding to the head character extracted in step 131. If the result obtained in step 133 is YES, a counter is reset to zero (c=0) in step 134. After this, in step 135, the CPU reads out the position data identified by a count value of the counter from the address table. The CPU 10 then, in step 136, reads out characters in a predetermined region in the text file, which region includes a position identified by the position data read out in step 135. It is determined, in step 137, whether or not a character string formed of characters of the retrieval key is in the characters read out in step 136. When the character string corresponding to the retrieval key is in the characters in the predetermined region, the retrieval result is displayed on the display unit 16, in step 138. The counter is then, in step 139, incremented by one, and it is determined, in step 140, whether or not the count value of the counter reaches the number identified by the character number data classified under the next character. When the count value does not reach the number identified by the character number data, the above process is repeated.

The retrieval result displayed on the display unit 16 includes, for example, the character string corresponding to the retrieval key and the position at which the character string is located in the text file.

On the other hand, when the character next to the head character in the retrieval key is not equal to a character identified by the next character code in step 133, the process is completed. In addition, when there is no character string corresponding to the retrieval key in the region in the text file, the retrieval result is not displayed on the display unit 16.

In the above retrieving process, when the retrieval key "NWN" shown in FIG. 13B is input from the keyboard 12, a character "N" is selected as the head character. Initial position information "2" corresponding to the head character "N" is obtained from the initial position table. The next character codes "H" and "W" corresponding to the head character "N" are respectively listed at the initial position "2" and the position "3" in the address table. As a character "W" is arranged next to the head character "N" in the retrieval key, items of the position data "0", "4" and "6" corresponding to the next character code "W" are selected from the address table. As to the head character "N" positioned at the selected position "0", the characters "NWM" are arranged at consecutive positions "0", "1" and "2" in the text file, and as to the head character "N" positioned at the selected position "4" the characters "NWN" are arranged at consecutive positions "4", "5" and "6". However, as to the head character "N" positioned at the selected position "6" characters "NWT" which are not equal to the characters "NWN" of the retrieval key, are arranged at consecutive positions "6", "7" and "8". Thus, in this case, two strings "NWN" positioned at the consecutive positions "0", "1" and "2" and "4", "5" and "6" are retrieved from the text file.

According to the above retrieving process, items of the position data indicating positions of characters in the text file are classified under the next character code. Thus, the size of the address table can be small.

The initial position table and the address table as shown in FIG. 16 can be also used for retrieving character strings from the text file.

The address table shown in FIG. 16 has the same structure as that shown in FIG. 14. The initial position table show in FIG. 16 has frequency data corresponding to each character code. The frequency data indicates a frequency with which a correspond character appears in the text file. For example, items of the frequency data "4" and "3" respectively corresponding to the character codes of "N" and "w" are listed in the initial position table.

Figure 17:
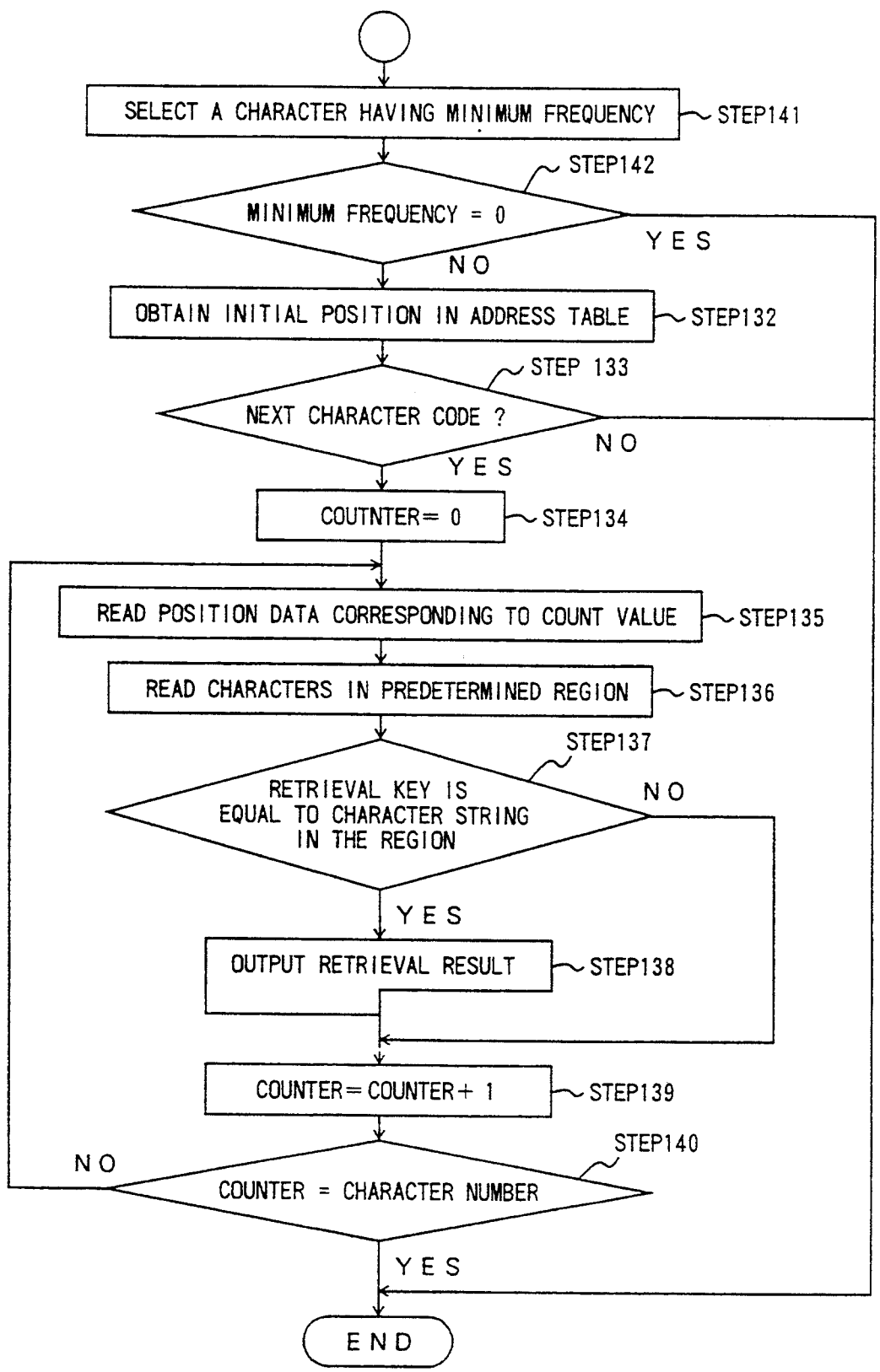
FIG. 17 is a flow chart illustrating a sixth embodiment of the first retrieving process.

The first retrieving process 100 may be performed with reference to the initial position table and the address table as shown in FIG. 16, in accordance with the flow chart as shown in FIG. 17. In FIG. 17, those steps which are the same as the steps shown in FIG. 15 are given the same reference numbers.

In the process shown in FIG. 17, a character having a minimum frequency data is selected, with reference to the initial position table, from the characters of the retrieval key in step 141. Then, in step 142, it is determined whether or not the minimum frequency is zero. When the minimum frequency data is not zero, the process is performed in accordance with the same procedure as the process shown in FIG. 15. On the other hand, when the minimum frequency data is zero, a corresponding character is not in the text file. Thus, in this case, the process is completed.

In a case where the retrieval key is "NWN", the character "W" is selected as a character having the minimum frequency. Thus, items of the position data "1" and "5" corresponding to the next character code of "N" are selected. That is, the retrieving processes regarding two items of the position data "1" and "5" are performed, in accordance with steps 135 through 140.

According to the above retrieving process, the character string of the retrieval key is retrieved based on the character having the minimum frequency data. Thus, the number of reference operations of the address table and text file can be decreased. That is, the retrieving speed can be improved.

Figure 18:
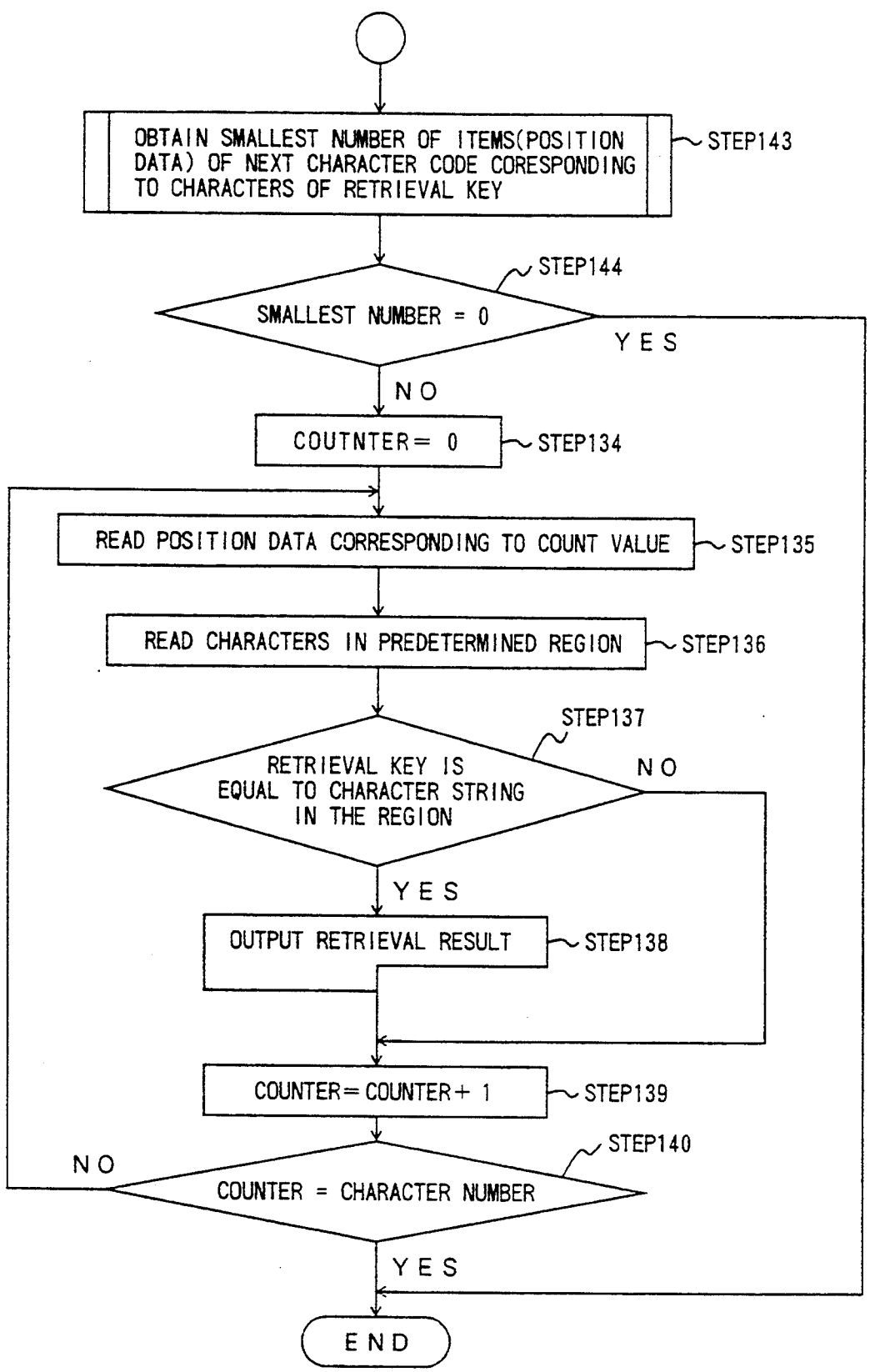
FIG. 18 is a flow chart illustrating a seventh embodiment of the first retrieving process.

The first retrieving process 100 may also be performed in accordance with the flow chart as shown in FIG. 18. In FIG. 18, those steps which are the same as the steps shown in FIG. 15 are given the same reference numbers.

The process shown in FIG. 18 is performed with reference to initial position table and the address table as shown in FIG. 14. Referring to FIG. 18, in step 143, the following process is performed. Except for a character positioned at the tail end of the retrieval key, the initial position data for all other respective characters of the retrieval key is obtained with reference to the initial position table. The next character codes corresponding to the characters of the retrieval key are retrieved from the address table based on the initial position data. The next character codes identifying the characters actually positioned next to the corresponding characters in the retrieval key are selected. A next character code corresponding to the smallest character number data is further selected from the selected next character codes. In a case where the retrieval key "NWN" is input from the keyboard, the next character code of "N" corresponding to the character "W" is selected as the next character code corresponding to the smallest character number "2". After this, in step 144, it is determined whether or not the smallest character number data is zero or not. When the smallest character data is zero, the process is completed. On the other hand, when the smallest character data is not zero, for example, "2", the process is performed in accordance with the same steps 134 through 140 shown in FIG. 15.

According to the above retrieving process, the character string of the retrieval key is retrieved based on the smallest character number data indicating the number of appearances of each character string formed of two characters in the text file. Thus, the number of reference operations of the address table and text file can be decreased. That is, the retrieving speed can be improved.

In the system as shown in FIG. 1, the index including the frequency data, the position data (the address information) and the next character codes is automatically made as follows.

Figure 19:
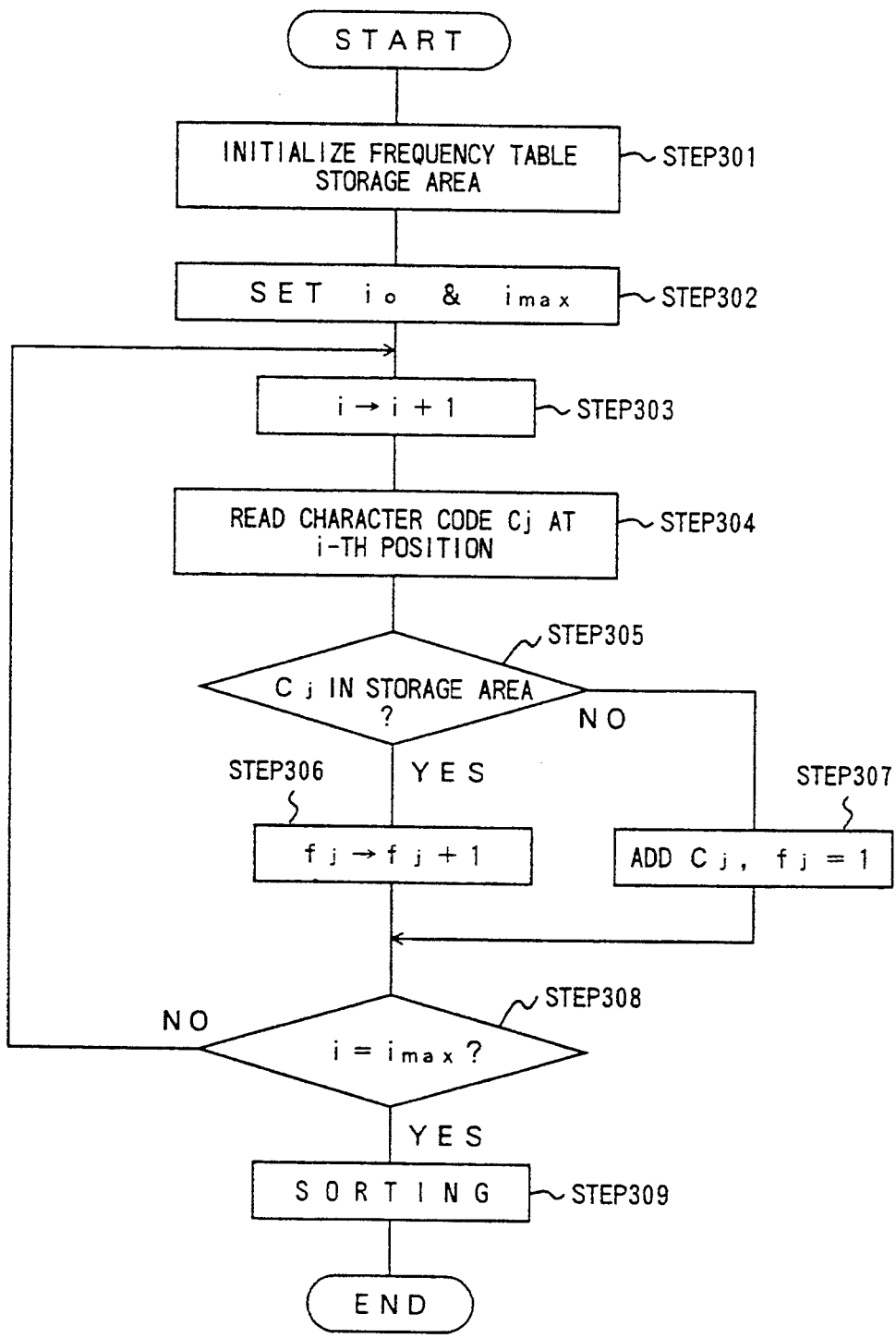
FIG. 19 is a flow chart illustrating a first embodiment of a process for making the index used in the character string retrieval system.

The frequency table indicating the frequency data for each of the characters in the text file is made in accordance with a process as shown in FIG. 19.

Referring to FIG. 19, in step 301, the CPU 10 initializes a frequency table storage area in the memory 11. When an operator inputs an initial value $i_o$ of an address counter and a maximum value $i_{max}$ thereof, the initial value $i_o$ is set in the address counter and the maximum value $i_{max}$ is set in a register, in step 302. The initial value $i_o$ corresponds to the head of a retrieving area in the text file. The maximum value $i_{max}$ corresponds to the tail end of the retrieving area in the text file. When the initial value $i_o$ and the maximum value $i_{max}$ are respectively "0" and the tail end of the text file, the whole text file is retrieved.

Then, in step 303, the address counter is incremented by one. In step 304, the CPU 10 reads out a character code $C_j$ positioned at the i-th position identified by the count value i of the address counter. After this, it is determined, in step 304, whether or not the character code $C_j$ has already been stored in the frequency table storage area. When the character code $C_j$ has already been stored in the frequency table storage area, the frequency data $f_j$ for the character code $C_j$ is incremented by one, in step 306. On the other hand, when the character code $C_j$ has not yet been stored in the frequency table storage area, the character code $C_j$ is added to the frequency table storage area and the frequency data $f_j$ for the character code $C_j$ is set to "1", in step 307. After that, it is determined, in step 308, whether or not the count value i of the address counter reaches the maximum value $i_{max}$. When the count value i of the address counter has not yet reached the maximum value $i_{max}$, the address counter is incremented by one, in step 303 and the above process is repeated. On the other hand, when all characters in the retrieving area have been read out, the count value of the address counter reaches the maximum value $i_{max}$. At this time, the process proceeds to step 309. In step 309, a sorting process is performed. Due to this sorting process, the character codes and corresponding frequency data stored in the frequency table storage area are sorted in a predetermined order. The character codes and the frequency data are arranged, for example, in an order that the frequency data increases from a minimum value, as shown in FIG. 3.

Figure 20:
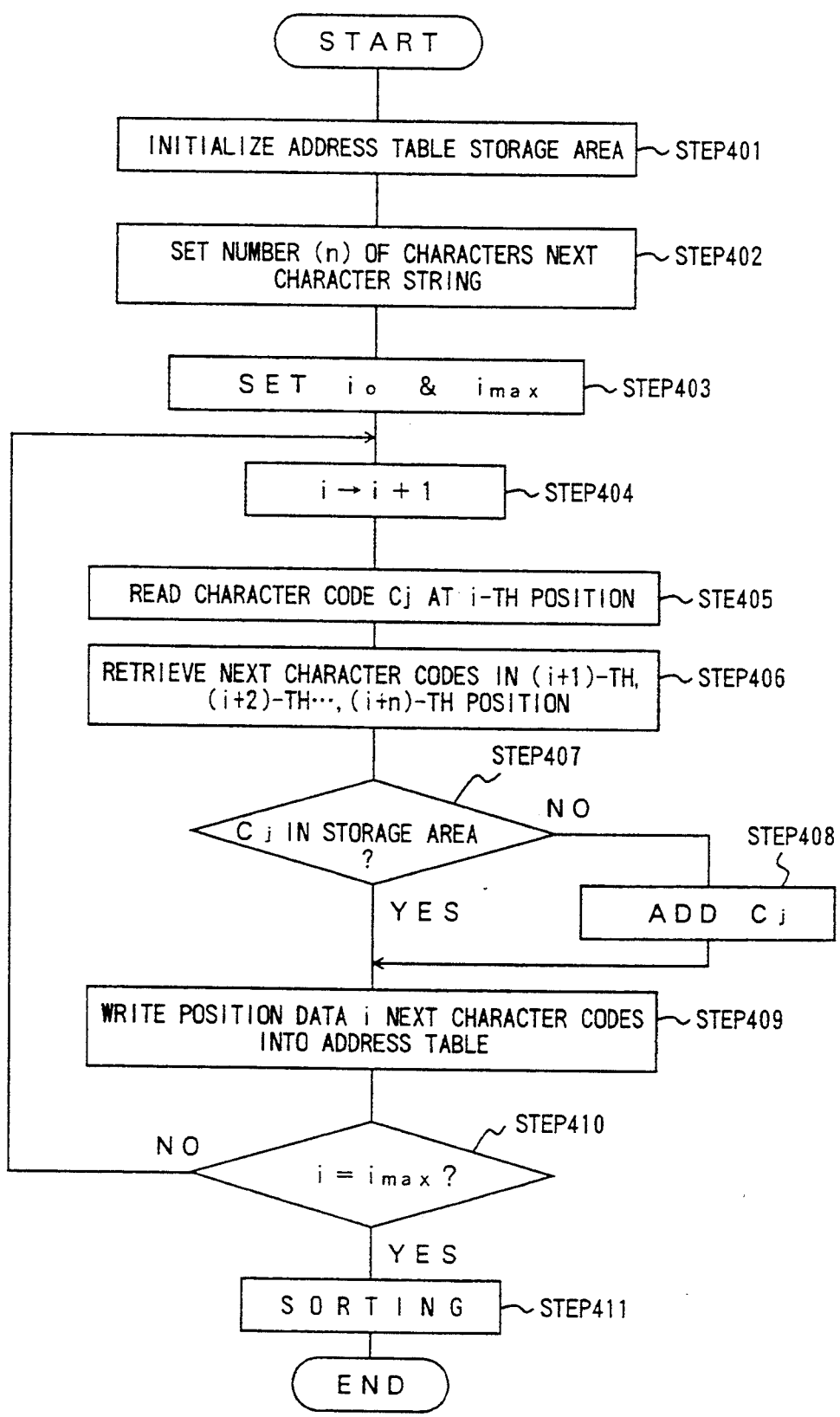
FIG. 20 is a flow chart illustrating a second embodiment of the process for making the index used in the character string retrieval system.

The address table including the position data (the address information) and the next character codes is made in accordance with a process as shown in FIG. 20.

Referring to FIG. 20, in step 401, the CPU 10 initializes an address table storage area in the memory 11. When the operator inputs the number (n) of the next character codes to be listed in the address table, the CPU 10 sets the number (n) of the next character codes for each character into a register, in step 402. Then, in step 403, an initial value $i_o$ is set in an address counter and the maximum value $i_{max}$ is set in a register, in the same manner as in step 302 shown in FIG. 19.

After the initial value $i_o$ is set in the address counter, in step 404, the address counter is incremented by one. In step 405, the CPU 10 reads out a character code $C_j$ positioned at an i-th position identified by the count value i of the address counter. After this, in step 406, the CPU 10 retrieves n next character codes identifying characters positioned at the (i+1)-th, (i+2)-th, ..., and (i+n)-th positions from the text file. After the n next character codes are retrieved, the CPU 10 determines, in step 407, whether or not the character code $C_j$ has already been stored in the address table storage area. When the character code $C_j$ has not yet been stored in the address table storage area, the character code $C_j$ is added to the address table storage area, in step 308. After either step 307 or 308, the CPU 10 writes the position data (the address information) corresponding to the count value i of the address counter and the n next character codes are stored in the address table storage area so as to correspond to the character code $C_j$. After this, it is determined, in step 410, whether or not the count value i of the address counter reaches to the maximum value $i_{max}$. When the count value i of the address counter has not yet reached the maximum value $i_{max}$, the address counter is incremented by one, in step 404 and the above process is repeated. On the other hand, when the count value of the address counter reaches the maximum value $i_{max}$, the process proceeds to step 411. In step 410, a sorting process is performed in the same manner as that in step 309 shown in FIG. 19. Due to the sorting process in step 410, the position data (the address information) and corresponding next character codes stored in the address table storage area are sorted in a predetermined order. The position data and the corresponding next character codes are arranged, for example, in the same order as the frequency data in the frequency table shown in FIGS. 3 and 4.

Figure 21:
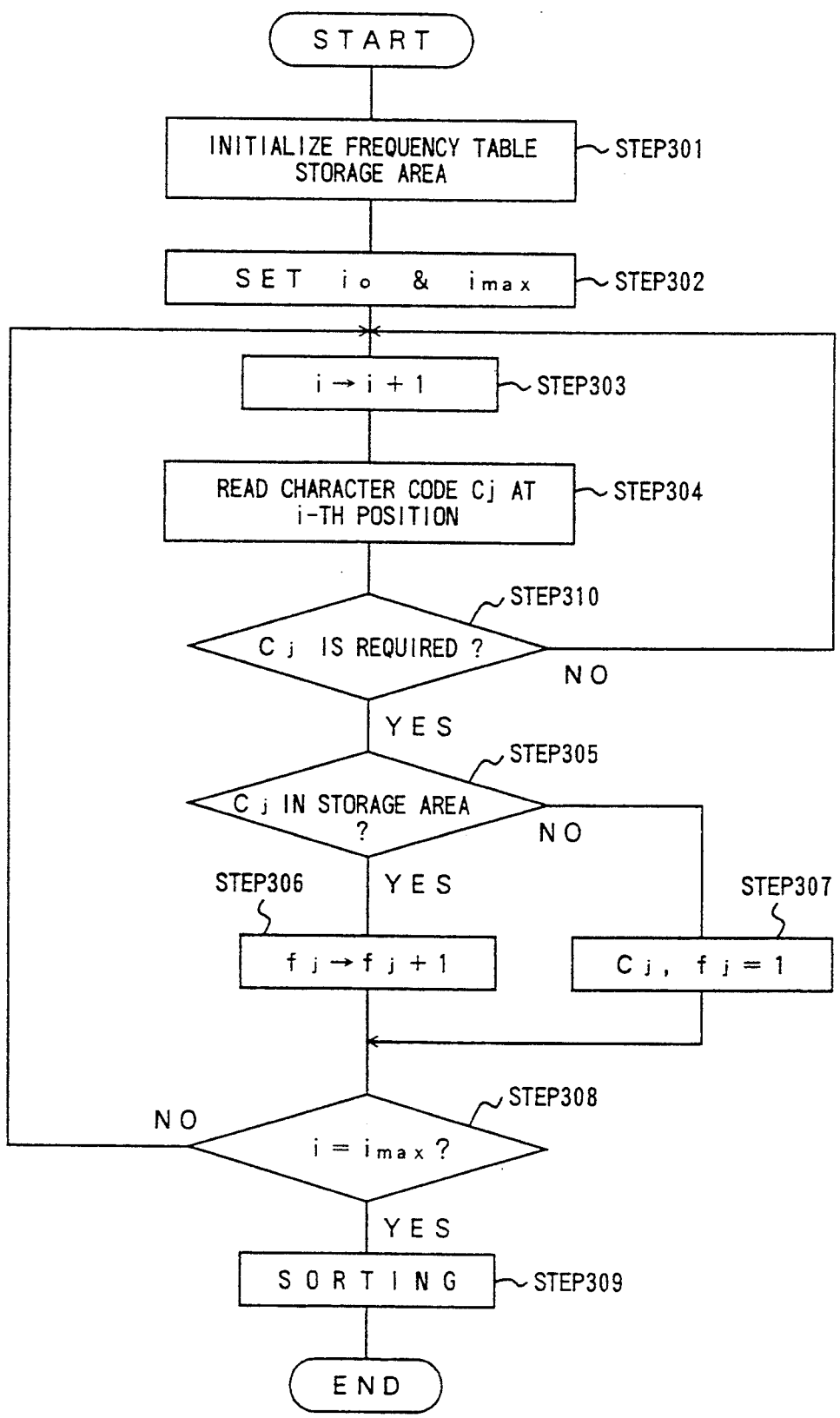
FIG. 21 is a flow chart illustrating a third embodiment of the process for making the index used in the character string retrieval system.

The frequency table may also be made in accordance with a process as shown in FIG. 21. In FIG. 21, those steps which are the same as the steps shown in FIG. 19 are given the same reference numbers. Due to the process shown in FIG. 21, only the frequency data corresponding to characters actually necessary to the retrieving process can be stored in the frequency table storage area.

Referring to FIG. 21, step 310 is added between steps 304 and 305 shown in FIG. 19. In step 310, the CPU 10 determines whether or not the character code $C_j$ is necessary to the retrieving process based on information which has been previously input by the operator. When the character code $C_j$ is not necessary to the retrieving process, the process returns to step 303. That is, the character code $C_j$ is not stored in the frequency table storage area.

If information that Japanese "hiragana" characters are omitted from the frequency table is input to this system, the frequency data for Japanese "hiragana" character is not stored in the frequency table storage area in the memory 11.

Figure 22:
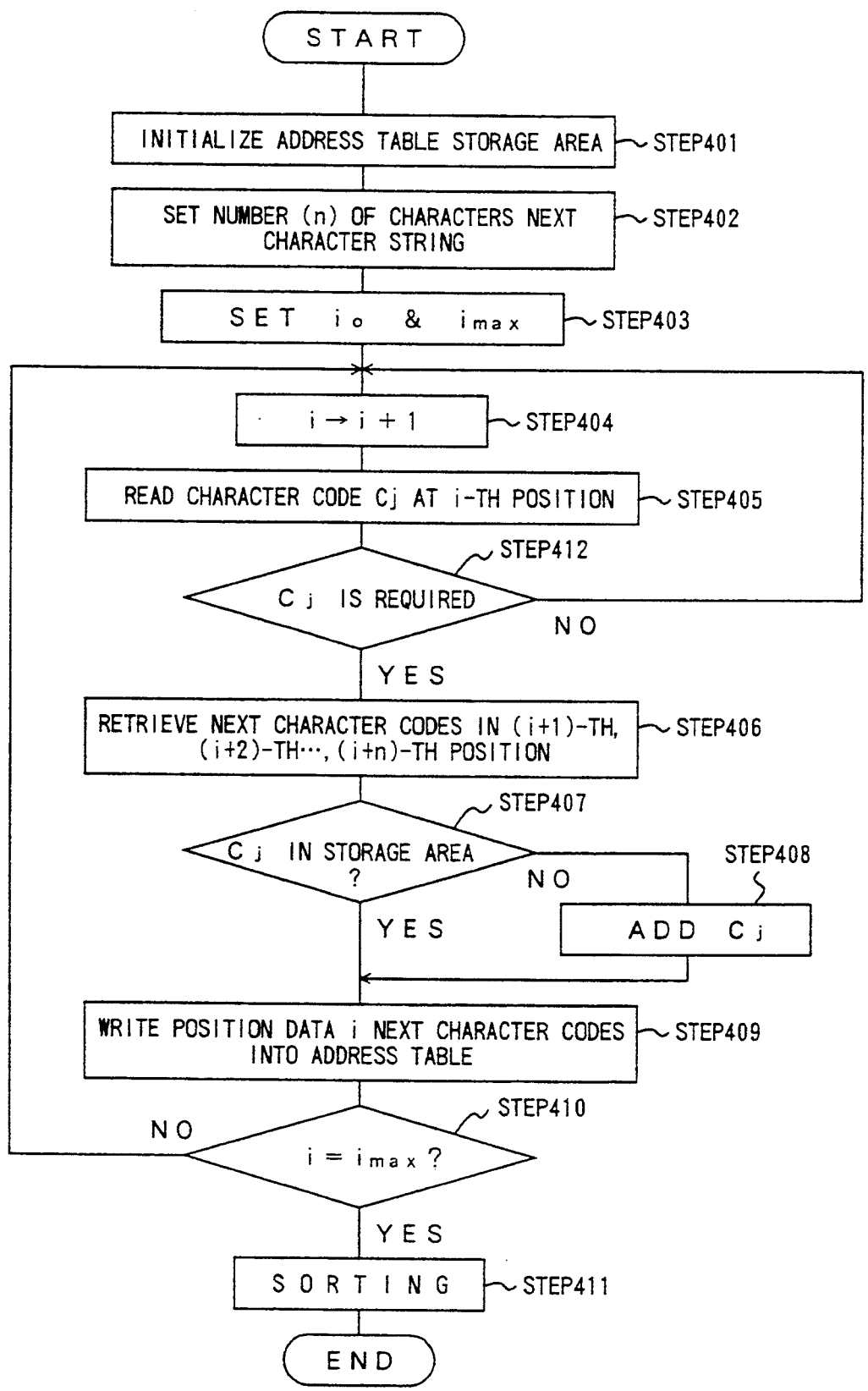
FIG. 22 is a flow chart illustrating a fourth embodiment of the process for making the index used in the character string retrieval system.

The address table may also be made in accordance with a process as shown in FIG. 22. In FIG. 22, those steps which are the same as the steps shown in FIG. 20 are given the same reference numbers. Due to the process shown in FIG. 22, only the position data (the address data) and the next character codes corresponding to characters actually necessary to the retrieving process can be stored in the address table storage area.

Referring to FIG. 22, step 412 is added between steps 405 and 406 shown in FIG. 20. In step 412, it is determined whether or not the character code $C_j$ is necessary to the retrieving process in the same manner as in the step 310 shown in FIG. 21.

In the address tables shown in FIGS. 3, 7, 14 and 16, the next character codes for a plurality of characters may be listed, in the same manner as the address table shown in FIG. 9.

The present invention is not limited to the aforementioned embodiments, and variations and modifications may be made without departing from the scope of the claimed invention.

What is claimed is:

1. A character string retrieval system for retrieving a character string corresponding to a retrieval key input thereto from a text file including a plurality of characters, said system comprising:
    an index indicating position data identifying a position of each of characters in the text file and indicating next character data identifying either a character or a character string formed of a plurality of characters arranged next to each of the characters in the text file;
    selecting means for selecting a first character from characters forming the character string corresponding to the retrieval key;
    determining means for determining, with reference to said index, whether or not a character or a character string next to the first character, selected by said selecting means, in the retrieval key is equal to a character or a character string identified by the character data corresponding to the first character; and
    output means for outputting a retrieval result when said determining means determines that a character or a character string next to the first character in the retrieval key is equal to a character or a character string identified by the character data corresponding to the first character, the retrieval result being obtained based on the position data corresponding to the first character in said index.

2. A system as claimed in claim 1, wherein the first character selected by said selecting means is a character positioned at a head of the retrieval key.

3. A system as claimed in claim 1, wherein said selecting means has a frequency table provided with frequency data for each of the characters in the text file, the frequency data indicating a frequency with which each of the characters appears in the text file, said selecting means selecting, with reference to the frequency table, a character corresponding to a minimum frequency data as the first character.

4. A system as claimed in claim 3, wherein the frequency data is arranged in a predetermined order in said frequency table, and position data and the next character data in said index are respectively arranged in an order corresponding to the order for the frequency data.

5. A system as claimed in claim 4, wherein the frequency data is arranged in an increasing order from a minimum value.

6. A system as claimed in claim 3, wherein said frequency table is provided with information for coupling the frequency data for each of the characters to the position data and the next character data in said index, and wherein said determining means searches in said index the position data and the next character data for the first character using said information provided in said frequency table.

7. A system as claimed in claim 1, wherein one or a plurality of items of the position data corresponding to each character and number data are listed, in said index, under each item of the next character data corresponding to each character, the number data indicating a number of items of the position data corresponding to each character.

8. A system as claimed in claim 7, wherein said index includes a table listing characters included in the text file, each of the characters listed in said table being coupled to corresponding next character data.

9. A system as claimed in claim 8, said table is provided with frequency data for each of the characters listed in said table, the frequency data indicating a frequency with which each of the characters appears in the text file, said selecting means selecting, with reference to the frequency data in said table, a character corresponding to a minimum frequency data as the first character.

10. A system as claimed in claim 7, wherein said selecting means selects as the first character, with reference to said index, a character corresponding to an item of the next character data under which a smallest number of items of the position data is listed.

11. A character string retrieval system for retrieving a character string corresponding to a retrieval key input thereto from a text file including a plurality of characters, said system comprising:
    an index indicating position data identifying a position of each of characters in the text file and indicating next character data identifying either a character or a character string formed of a plurality of characters arranged next to each of the characters in the text file;
    selecting means for selecting a first character from characters forming the character string corresponding to the retrieval key;
    first determining means for determining, with reference to said index, whether or not a character or a character string next to the first character, selected by said selecting means, in the retrieval key is equal to a character or a character string identified by the next character data corresponding to the first character;
    second determining means for determining whether or not a character string formed of the characters in the retrieval key is in a predetermined region in the text file, said region including a position identified by the position data for the first character; and output means for outputting a retrieval result when said second determining means determines that the character string is in the region in the text file, the retrieval result being obtained based on the position data corresponding to the first character in said index.

12. A system as claimed in claim 11, wherein the first character selected by said selecting means is a character positioned at a head of the retrieval key.

13. A system as claimed in claim 11, wherein said selecting means has a frequency table indicating frequency data for each of the characters in the text file, the frequency data indicating a frequency with which each of the characters appears in the text file, said selecting means selecting, with reference to the frequency table, the first character which is a character corresponding to a minimum frequency data.

14. A system as claimed in claim 13, wherein the frequency data is arranged in a predetermined order in said frequency table, and position data and the next character data in said index are respectively arranged in an order corresponding to the order for the frequency data.

15. A system as claimed in claim 14, wherein the frequency data is arranged in an increasing order from a minimum value.

16. A system as claimed in claim 13, wherein said frequency table is provided with information for coupling the frequency data for each of the characters to the position data and the next character data in said index, and wherein said determining means searches in said index the position data and the next character data for the first character using said information provided in said frequency table.

17. A system as claimed in claim 11, wherein one or a plurality of items of the position data corresponding to each character and number data are listed, in said index, under each item of the next character data corresponding to each character, the number data indicating a number of items of the position data corresponding to each character.

18. A system as claimed in claim 17, wherein said index includes a table listing characters included in the text file, each of the characters listed in said table being coupled to corresponding next character data.

19. A system as claimed in claim 18, said table is provided with frequency data for each of the characters listed in said table, the frequency data indicating a frequency with which each of the characters appears in the text file, said selecting means selecting, with reference to the frequency data in said table, the first character which is a character corresponding to a minimum frequency data.

20. A system as claimed in claim 17, wherein said selecting means selects, with reference to said index, the first character which is a character corresponding to an item of the next character data under which a smallest number of items of the position data are listed.

21. A unit for making an index used in a character string retrieval system for retrieving a character string corresponding to a retrieval key input thereto from a text file including a plurality of characters, said index indicating position data identifying a position of each of characters in the text file and indicating next character data identifying either a character or a character string formed of a plurality of characters arranged next to each of the characters in the text file, said unit comprising:

searching means for successively searching characters in the text file one by one;

detecting means for detecting a predetermined number of characters arranged, in the text, next to a character searched by said searching means;

listing means for listing the position data identifying a position at which the character searched by said searching means is positioned in the text file and listing the next character data identifying one or a plurality of characters detected by said detecting means, so that the index indicating the position data and the next character data is made.

22. A unit as claimed in claim 21, wherein said detecting means detects one character arranged, in the text file, next to the character searched by said searching means.

23. A unit as claimed in claim 21, wherein said detecting means detects a plurality of characters arranged, in the text file, next to the character searched by said searching means.

24. A unit as claimed in claim 21, wherein said detecting means has number setting means for setting a number of characters to be detected by said detecting means.

25. A unit as claimed in claim 21, wherein said searching means has region setting means for setting a region in the text file, said searching means searching characters in said region.

26. A unit as claimed in claim 25, wherein said region setting means has means for setting an initial position of the region and an end position of the region.

27. A unit as claimed in claim 21, further comprising:

determining means for determining whether or not the position data and the next character data corresponding to a character searched by said searched means are needed in the index, wherein the position data and next character data are listed by said listing means when the determining means determines that the position data and the next character data are needed in the index.

28. A unit for making an index used in a character string retrieval system for retrieving a character string corresponding to a retrieval key input thereto from a text file including a plurality of characters, said index indicating frequency data for each of the characters in the text file, the frequency data indicating a frequency with which each of the characters appears in the text file, said unit comprising:

searching means for successively searching characters in the text file one by one;

counting means for counting a number of appearances of a character in the text file, said character being searched by said searching means; and listing means for listing the frequency data corresponding to a count value obtained by said counting means, so that the index indicating the frequency data is made.

29. A unit as claimed in claim 28, wherein said searching means has region setting means for setting a region in the text file, said searching means searching characters in said region.

30. A unit as claimed in claim 29, wherein said region setting means has means for setting an initial position of the region and an end position of the region.

31. A unit as claimed in claim 28, further comprising:

determining means for determining whether or not the frequency data corresponding to a character searched by said searching means is needed in the index, wherein the frequency data is listed by said listing means when the determining means determines that the frequency data is needed in the index.

* * * * *